Figure 1:
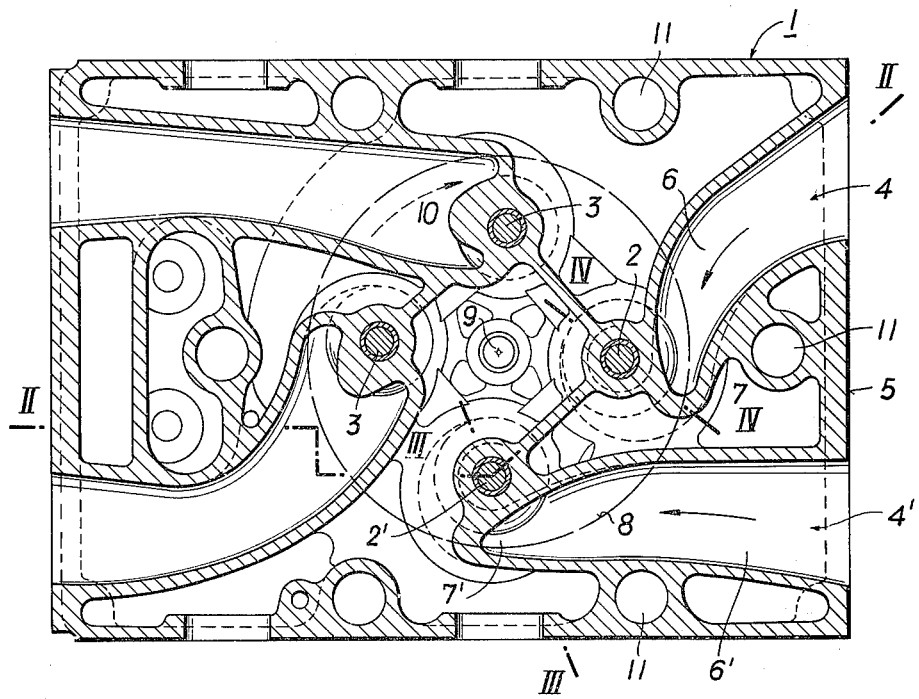

United States Patent [19]
List

[11] 3,898,966
[45] Aug. 12, 1975

[54] CYLINDER-HEAD OF AN INTERNAL COMBUSTION ENGINE WITH TWO INTAKE VALVES FOR EACH CYLINDER

[76] Inventor: Hans List, 126 Heinrichstrasse, Graz, Austria

[22] Filed: Mar. 30, 1971

[21] Appl. No.: 129,344

[52] U.S. Cl.............................. 123/75 B; 123/188 M
[51] Int. Cl............................................ F02b 75/00
[58] Field of Search ......... 123/30 C, 188 M, 191 R, 123/75 B

[56] References Cited
UNITED STATES PATENTS

| | | | |
|---|---|---|---|
| 2,318,915 | 5/1943 | Anderson et al................ | 123/30 C |
| 3,054,390 | 9/1962 | Meurer et al. ................ | 123/188 M |
| 3,240,190 | 3/1966 | Christian et al................ | 123/30 C |
| 3,274,981 | 9/1966 | Péras................................ | 123/30 C |
| 3,411,490 | 11/1968 | Ahana............................ | 123/188 M |
| 3,590,789 | 7/1971 | Wiebiche et al............... | 123/188 M |

Primary Examiner—Martin P. Schwadron
Assistant Examiner—Allen M. Ostrager
Attorney, Agent, or Firm—Watson, Cole, Grindle & Watson

[57] ABSTRACT

A cylinder head of an internal combustion engine having two intake valves for each cylinder arranged in an eccentric relation to the cylinder axis and having separate inlet ducts extending from the suction-end side wall of the cylinder head to the intake valves, each of the inlet ducts having a spiral section surrounding its intake valve and another section extending between the spiral section to the suction-end side wall of the cylinder.

2 Claims, 4 Drawing Figures

CYLINDER-HEAD OF AN INTERNAL COMBUSTION ENGINE WITH TWO INTAKE VALVES FOR EACH CYLINDER

The invention relates to a cylinder-head of an internal combustion engine with two intake valves for each cylinder arranged in an eccentric relation to the cylinder axis and having separate inlet ducts leading from the suction-end sidewall of the cylinder-head to the intake valves, each of the said inlet ducts comprising a spiral section surrounding the intake valve and another section extending between the said spiral section and the suction-end sidewall of the cylinder.

The two intake valves of a known cylinder-head of this type are arranged in a plane parallel to the longitudinal median plane including the cylinder axes and offset in relation to the suction-end sidewall of the cylinder head, one of the two inlet ports being formed by a helical duct of conventional design through which the air flows to the associated intake valve in a direction essentially tangential to the inner wall of the cylinder, whereas the other inlet port extends from the suction-end sidewall of the cylinder-head initially in a direction opposed to the required direction of the air inside the cylinder. This section of the second inlet duct is followed by a sharply bent duct section definitely altering the direction of the air flow, as a result of which the air flowing in the area of the associated intake valve is given the required direction in accordance with the desired sense of rotation in the cylinder. The purpose of this arrangement is to avoid such difficulties as are likely to arise in connection with the accommodation of fixing screws and bolts, injection nozzles, cooling-water chambers and other elements to be mounted inside the cylinder-head as well as with the provision of the inlet ports. However, an essential drawback of conventional cylinder-head design resides in the fact that the sharply bent inlet duct offers considerable resistance to the smooth flow of the air. This fact is responsible for major variations between flow conditions in differently shaped inlet ducts. It is therefore, difficult to attain uniform rotation of the air in the cylinder with similar arrangements of the ducts.

In addition, the sharp bend of an inlet duct of conventional design impairs the full ultilization of the shock waves of drawn-in air for the proper filling of the cylinder, since the shock waves are partially reflected by the sharp bend.

It is the purpose of the present invention to overcome these shortcomings of conventional cylinder-head design. The invention therefore, comprises a combination of the following features:

a. One intake valve of each cylinder is located at least approximately in the longitudinal median plane of the internal combustion engine including the cylinder axes;

b. The second intake valve of each cylinder is offset by about 90° in relation to the suction-end of the engine as compared with the first-mentioned intake valve;

c. At the transition between the spiral and the straight section of the duct, the inlet ducts extend in an approximately tangential relation to the inner wall of the associated cylinder;

d. The section of the inlet duct leading to the first-mentioned intake valve and emerging from the suction-end sidewall of the cylinder-head extends essentially in perpendicular relation to the suction-end sidewall of the cylinder-head, and e. The section of the inlet duct leading to the second intake valve and emerging from the suction-end sidewall of the cylinder-head extends along a curved line with a bend opposed to the spiral-shaped section of the duct.

By reason of this particular design it is possible to take full advantage of the space available between the usual screws and bolts and other elements to be incorporated in the cylinder-head for the accomodation of inlet ducts of proper shape and with comparatively large cross-sections and to achieve almost balanced flow conditions in each of the two ducts with the avoidance of excessively sharp bends.

The cylinder-head design according to the invention also takes care of the fact that a uniform discharge of air over the entire periphery of the valve clearance is generally hardly attainable as the air is usually discharged in the direction forcibly imparted to it by the duct section emerging from the suction-end sidewall of the cylinder-head. Owing to the fact that at the transition from the straight to the spiral-shaped duct section the inlet ducts are given a direction which is approximately tangential in relation to the inner wall of the cylinder-head, in addition to such portions of air as are imparted a rotary motion by the spiral-shaped duct section, also such portions of the air as are not influenced in this way can be directed in the sense of rotation provided by the spiral-shaped duct sections following their discharge from the valve clearance and their impingement upon the cylinder wall, so as to produce the greatest rotation of air possible inside the cylinder.

Substantially larger space available as a result of arangements according to the invention facilitating the accommodation of the inlet duct also makes it possible to provide for an appropriate design and convenient size both of the admission elements and of the spiral-shaped section of the inlet ducts.

According to a further feature of the invention, it is possible for the spiral-shaped duct sections of both inlet ports to be of approximately the same size and shape. This also makes for greater uniformity of the desired rotary flow of air inside the cylinder.

Figure 2:
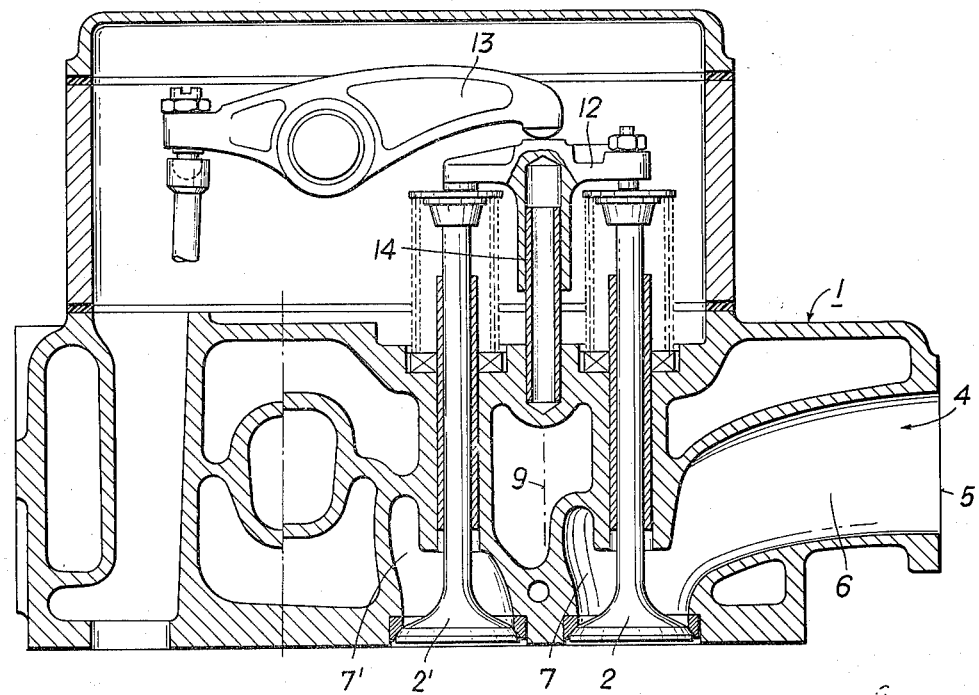
Figure 3:
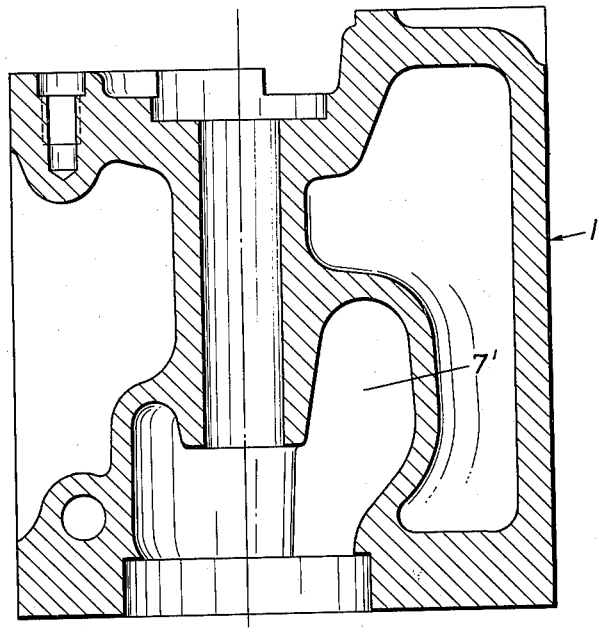
Figure 4:
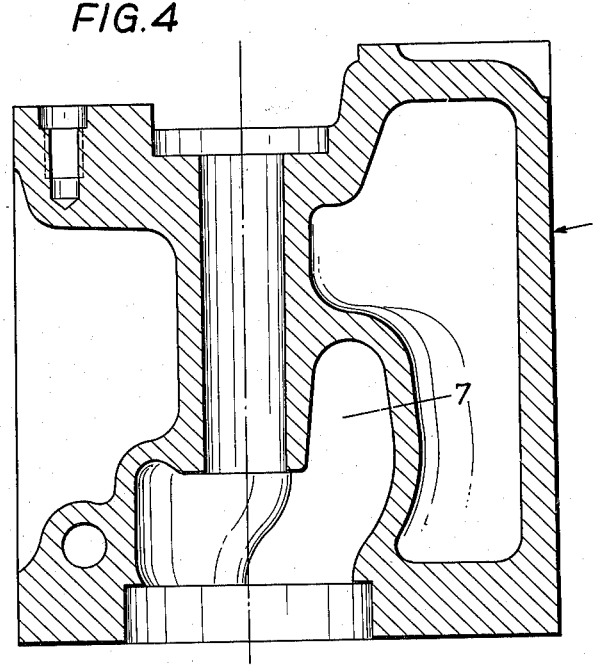

Further details of the invention will become apparent from the following description of an embodiment of the invention with reference to the accompanying drawing in which FIG. 1 shows a horizontal cross-section of the cylinder-head of a water-cooled internal combustion engine of the four-valve type according to the invention, FIG. 2 is a cross-sectional view on line II—II of FIG. 1, and FIGS. 3 and 4 are further cross-sectional views on lines III—III and IV—IV, respectively, of FIG. 1.

The cylinder-head 1 shown in the drawings comprises two suspended intake valves 2, 2' and two suspended exhaust valves 3. The axes of both the intake valves 2, 2' and of the exhaust valves 3 are each located in a plane forming an angle of approximately 45° with the crankshaft axis. The air for combustion is supplied to the two intake valves 2, 2' through separate inlet ducts 4 and 4' emerging from the suction-end sidewall 5 of the cylinder head. The inlet ducts 4 and 4' each comprise a straight section 6 and 6' respectively, followed by a spiral-shaped section 7 and 7' respectively, leading to the intake valve 2, 2'. The inlet ducts are arranged in such a way that the straight duct sections 6, 6' are directed tangentially to the inner wall 8 of the associated cylinder in the place where they meet the spiral-shaped duction sections 7, 7'. Section 6' of the inlet duct 4' is approximately straight and extends in perpendicular relation to the sidewall 5 of the cylinder-head, whereas the duct section 6 of the other inlet duct 4 has only a slight bend and extends in oblique relation to the sidewall 5 of the cylinder-head. The essential feature of this arrangement of ducts resides in the fact that in both inlet ducts the air flows in the same sense of rotation in relation to the cylinder axis 9 as does the air rotating inside the cylinder in the direction of the arrow 10.

This design of ducts provides not only an increased rotary flow inside the cylinder but makes it also possible to take full advantage of the space available between the apertures 11 for the location of cylinder-head screws (not shown in the drawing) for the accommodation on inlet ducts of large cross-sections.

With this valve arrangement it is possible to provide for the operation (known per se) of two like valves via a valve bridge 12 operated by means of the valve rocker 13 and slidingly guided on a tube 14 mounted in the cylinder-head 1.

I claim:

1. A cylinder head of an internal combustion engine having two intake valves for each cylinder adjoining each other and arranged eccentrically in relation to the cylinder axis, the first of the two intake valves being arranged at least approximately in a longitudinal median plane of the internal combustion engine, the second intake valve being offset by approximately 90° towards the suction-end sidewall of the cylinder head in relation to the first intake valve, a first inlet duct extending from said cylinder head sidewall in transverse relation thereto to the first intake valve, a second inlet duct extending from said cylinder head sidewall to the second intake valve and having a convex curvature in relation to the cylinder axis, each said inlet duct comprising a spiral-like section wound around the axis of the associated intake valve and inclined towards the valve, whose sense of winding is identical for both inlet ducts, each inlet duct extending at the point of transition to the spiral-like section laterally outside the associated intake valve in relation to the cylinder axis and extending at the latter point in an approximately tangential relation to the inner wall of the associated cylinder.

2. A cylinder head according to claim 1, wherein the spiral-like sections of the two inlet ducts are at least approximately of the same shape and size.

* * * * *